Oct. 21, 1930.  B. DARROW  1,779,391

METHOD OF CONSTRUCTING PNEUMATIC TIRES

Filed Dec. 13, 1927

Inventor
Burgess Darrow.

By

Attorney

Patented Oct. 21, 1930

1,779,391

UNITED STATES PATENT OFFICE

BURGESS DARROW, OF AKRON, OHIO, ASSIGNOR TO THE GOODYEAR TIRE & RUBBER COMPANY, OF AKRON, OHIO, A CORPORATION OF OHIO

METHOD OF CONSTRUCTING PNEUMATIC TIRES

Application filed December 13, 1927. Serial No. 239,677.

This invention relates to methods of manufacturing pneumatic tire casings and it has particular relation to a novel method of applying breaker strips to pneumatic tire carcasses of the flat-built type.

In accordance with the present practice, so-called flat-built, pneumatic tires are formed upon a substantially cylindrical drum of superimposed plies of frictioned fabric. It is customary to apply a breaker strip and, subsequently, a tire tread element to the plies or carcass of the tire on the same drum. The assembly is then shaped to tire form and cured by various methods well known in the art.

One function of the breaker strip is to stiffen and strengthen the body of the tire to prevent cracking of the tread by reason of flexing of the tire when in service. During the tire shaping operation, the breaker strip is required to stretch from fifteen to forty-five percent, depending upon the size of the tire in which it is incorporated. The breaker strips are accordingly distorted by this stretch to such extent that the splices therein often separate and the very function of the breaker strip is thereby defeated.

One object of this invention is to provide a method of assembling a breaker strip and a tire carcass whereby undue distortion and rupture of the breaker strip is prevented.

Another object of the invention is to provide a method of assembling a breaker strip with a tire carcass which involves crimping of the strip, either before or at the time of its application to the carcass, to provide a surplus of breaker strip material about the carcass in an unshaped condition.

For a better understanding of the invention, reference may now be had to the accompanying drawings forming a part of this specification, in which.

Figure 1:
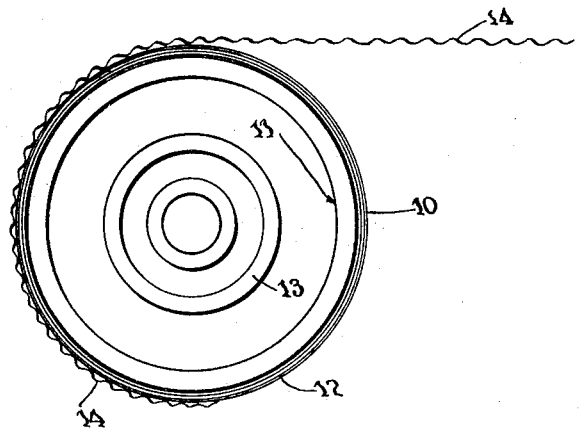
Fig. 1 is a diagrammatic view in side elevation illustrating the manner in which a breaker strip is applied to a tire carcass in accordance with this invention.

In practising the invention a plurality of plies 10 of tire material are superimposed upon a cylindrical drum 11 to form a body or carcass 12 of a tire. Means (not shown) is of course provided for rotating the drum 11 in the usual manner to facilitate the tire building operations and rotation of a hand wheel 13 serves to expand or contract the drum. In contradistinction to the present practice of tightly securing a straight breaker strip upon the carcass of the tire, a breaker strip 14 is applied to the carcass 12 in a crimped condition. This construction provides a surplus of breaker strip material upon the carcass in the flattened condition thereof, and permits a straightening of the strip followed by a limited stretching thereof during the shaping of the carcass. It will be observed that by crimping the breaker strip the length of the strip is reduced, although the actual amount of material lengthwise of the strip, within given limits, is increased. Likewise by slightly tensioning or expanding the breaker strip longitudinally after it has been crimped, its length is materially increased without subjecting the strip to excessive strains. It is to be understood in this specification that in referring to reducing or increasing the length of the breaker strip these terms have reference to such reducing or increasing of the length resulting from crimping or from removing the crimp from the breaker strip.

By the present method of applying breaker strips in the construction of flat-built tires, the breaker strip on a 29 x 4.75 tire, for example, receives approximately thirty-nine percent stretch during the shaping and curing operations. As hereinabove stated, such stretching of the breaker strip renders it weak and liable to rupture either during the shaping and curing operations or in subsequent use of the tire.

In accordance with this invention it is proposed to apply approximately fifteen per cent of added breaker strip stock to the body of a 29 x 4.75 tire. This may be done either by crimping the breaker strip prior to its application to the carcass or by feeding and applying the strip to the carcass at a greater speed than the speed of rotation of the drum on which the body is mounted. The percentage of increase in length of the breaker will of course vary as the size of the tire being constructed varies. In all cases the above-mentioned objectionable feature of flat-built tires, as at present constructed, is overcome by providing a surplus of breaker strip material to limit the stretch of the strip during the tire shaping and curing operations to a safe degree.

Figure 2:
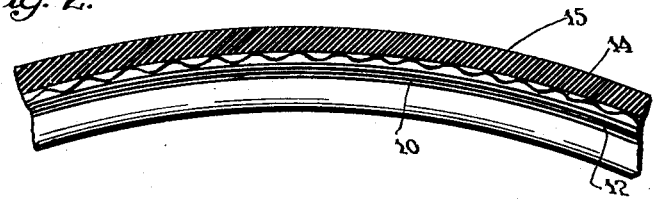
Fig. 2 is a fragmentary sectional view, on a larger scale, illustrating the condition of a breaker strip when disposed between a tire carcass and a tread element prior to the tire forming operation.
Figure 3:
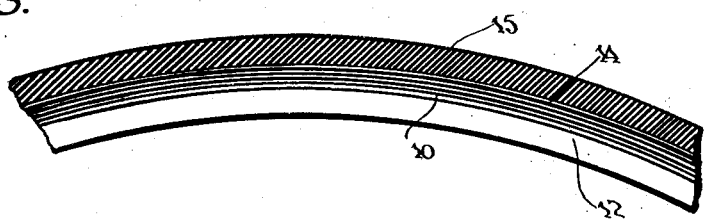
Fig. 3 is a similar view illustrating the relative positions and condition of the several elements after the tire forming operation.

A tread element 15 is mounted upon the breaker strip 14 in its crimped condition, as indicated in Fig. 2 of the drawing, and is secured to the carcass 12 in the usual manner. As the body 12 is shaped the breaker strip 14 first straightens and then stretches until the carcass assumes tire form. The condition of the breaker strip, tread and carcass in the completed tire is illustrated in Fig. 3 of the drawing.

Although I have illustrated only one form which my invention may assume and have described in detail only a single application thereof, it will be apparent to those skilled in the art that it is not so limited, but that various minor modifications may be made therein without departing from the spirit of the invention or from the scope of the appended claims.

What I claim is:

1. The method of constructing a tire which includes crimping a breaker strip, applying the crimped strip to a tire carcass with the line of crimp running transversely of the tire carcass, and removing the crimp by shaping the carcass and strip to tire form.

2. The method of constructing a tire which includes crimping the breaker strip, applying the crimped strip to an unshaped tire carcass with the line of crimp running transversely of the tire carcass, and removing the crimp by shaping the carcass and strip to tire form.

3. The method of constructing a tire which includes crimping a breaker strip, applying the crimped strip to a tire carcass, and removing the crimp from the strip by shaping the tire.

4. The method of constructing a tire which includes uniformly crimping a breaker strip, applying the crimped strip to a tire carcass, and removing the crimp from the strip by shaping the tire.

5. The method of constructing a tire which includes superimposing plies of tire material on a drum to constitute a tire body, crimping a breaker strip to reduce its length applying the crimped breaker strip to the tire body, and removing the crimp by shaping the assembled body and strip to tire form.

6. A method of constructing a tire which includes superimposing plies of tire material in substantially cylindrical form on a drum to constitute a tire body, crimping a breaker strip to reduce its length, applying the crimped breaker strip to the tire body, securing a tread element to the tire body and strip and removing the crimp from the strip by shaping the assembly to tire form without excessively stretching the breaker strip.

7. A method of constructing a tire which includes superimposing plies of tire material on a drum to constitute a tire body, crimping a breaker strip to reduce its length, applying the crimped strip to the tire body, securing a tread element to the tire body and strip, removing the crimp from the strip by shaping the assembly to tire form without excessively stretching the breaker strip, and vulcanizing the assembly.

8. A method of constructing a tire casing which includes applying to a flat-built tire carcass a ply of breaker strip material crimped to include more material than that required to extend circumferentially about the carcass while it is in cylindrical form, and shaping the carcass to toroidal form thereby further distributing the strip material circumferentially of the carcass until the strip material is under slight tension without imposing excessive stresses on said strip material.

9. A method of constructing a tire casing which includes applying to a flat-built tire carcass a ply of breaker strip material crimped to include more material than that required to extend circumferentially about the carcass while it is in cylindrical form, distributing said material uniformly throughout the zone of its circumferential engagement with the carcass, and shaping the carcass to toroidal form thereby further distributing the strip material uniformly circumferentially of the carcass until the strip material is under slight tension and is expanded to a size slightly exceeding its normal circumferential size, without imposing excessive stresses on said strip material.

In witness whereof, I have hereunto signed my name.

Signed at Akron, in the county of Summit, and State of Ohio, this 12th day of December, 1927.

BURGESS DARROW.